US012509845B2

(12) United States Patent
Murai et al.

(10) Patent No.: US 12,509,845 B2
(45) Date of Patent: Dec. 30, 2025

(54) WORK VEHICLE

(71) Applicant: KUBOTA CORPORATION, Osaka (JP)

(72) Inventors: Yu Murai, Sakai (JP); Keigo Sasaki, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 426 days.

(21) Appl. No.: 18/299,048

(22) Filed: Apr. 12, 2023

(65) Prior Publication Data

US 2023/0383494 A1 Nov. 30, 2023

(30) Foreign Application Priority Data

May 30, 2022 (JP) ................. 2022-087550

(51) Int. Cl.
| | | |
|---|---|---|
| E02F 3/34 | (2006.01) | |
| E02F 3/42 | (2006.01) | |
| E02F 9/08 | (2006.01) | |
| E02F 9/22 | (2006.01) | |

(52) U.S. Cl.
CPC ............ *E02F 3/3414* (2013.01); *E02F 3/422* (2013.01); *E02F 9/0808* (2013.01); *E02F 9/0866* (2013.01); *E02F 9/0891* (2013.01); *E02F 9/2271* (2013.01); *E02F 9/2275* (2013.01)

(58) Field of Classification Search
None
See application file for complete search history.

(56) References Cited

U.S. PATENT DOCUMENTS

| 9,039,344 | B1 | 5/2015 | Marcus | |
|---|---|---|---|---|
| 9,617,706 | B2* | 4/2017 | Takemura | ............. E02F 3/3414 |
| 10,190,286 | B2* | 1/2019 | Konrardy | ................. E02F 9/16 |
| 10,308,108 | B2* | 6/2019 | Honda | ................. E02F 9/0883 |

(Continued)

FOREIGN PATENT DOCUMENTS

| JP | 6738750 B2 | 8/2018 |
|---|---|---|
| JP | 2019-056296 | 4/2019 |
| JP | 2020-007907 | 1/2020 |

OTHER PUBLICATIONS

Japanese Office Action for corresponding JP Application No. 2022-087550, Feb. 18, 2025 (w/ machine translation).

(Continued)

*Primary Examiner* — Michael S Lowe
(74) *Attorney, Agent, or Firm* — MORI & WARD, LLP

(57) ABSTRACT

A work vehicle includes a vehicle body frame including a first inner frame including a first connection and a first inner projection projecting above the first connection in a height direction, a first outer frame including a second connection and a first outer projection projecting above the second connection in the height direction, and a first connection frame having a first opening and connected to the first connection and the second connection between the first inner frame and the first outer frame. A first arm hydraulic cylinder is provided to pass through the first opening. The first cover is configured to surround an outer periphery of the first arm hydraulic cylinder to cover the first opening and provided on the first connection frame to be slidably guided by the first connection frame, the first inner projection, and the first outer projection.

20 Claims, 14 Drawing Sheets

(56) References Cited

U.S. PATENT DOCUMENTS

| | | | |
|---|---|---|---|
| 10,362,738 B2 * | 7/2019 | Holcomb | A01G 23/081 |
| 11,208,786 B2 * | 12/2021 | Carlson | B62D 55/18 |
| 12,017,514 B2 * | 6/2024 | Minter | B60H 1/00378 |
| 2012/0251282 A1 | 10/2012 | Selvarajpandian et al. | |

OTHER PUBLICATIONS

Decision to Grant a Patent for corresponding JP Application No. 2022-087550, Apr. 15, 2025 (w/ machine translation).

* cited by examiner

WORK VEHICLE

CROSS-REFERENCE TO RELATED APPLICATIONS

The present application claims priority under 35 U. S. C. § 119 to Japanese Patent Application No. 2022-087550, filed May 30, 2022. The contents of this application are incorporated herein by reference in their entirety.

BACKGROUND OF THE INVENTION

Field of the Invention

The present invention relates to a work vehicle.

Discussion of the Background

U.S. Patent Application Publication No. 2012-0251282 discloses a work vehicle that includes a flexible boot to cover the periphery of a hydraulic cylinder for moving an arm in a vertical direction and prevent debris from entering through a through hole through which the hydraulic cylinder passes. U.S. Pat. No. 9,039,344 describes a work vehicle having an opening on a side panel of a vehicle body frame through which outside air can be taken in. Japanese Patent No. 6738750 describes a cover plate for closing an opening opened in a side panel of a vehicle body frame.

SUMMARY OF THE INVENTION

According to one aspect of the present disclosure, a work vehicle includes a vehicle body frame, a first arm assembly, a first arm hydraulic cylinder, and a first cover. The vehicle body frame includes a first inner frame, and a first outer frame, and a first connection frame. The first inner frame has a first connection and a first inner projection projecting above from the first connection in a height direction along a height of the work vehicle. The first outer frame has a second connection and is provided opposite to the first inner frame and has a second connection and a first outer projection projecting above from the second connection in the height direction. The first connection frame has a first opening and is connected to the first connection and the second connection between the first inner frame and the first outer frame. The first arm assembly is provided between the first inner frame and the first outer frame in a width direction perpendicular to the height direction and is connected to the first inner frame and the first outer frame rotatably about a first rotational axis that extends in the width direction. The first arm hydraulic cylinder is provided between the first inner frame and the first outer frame in the width direction to pass through the first opening. The first arm hydraulic cylinder is connected to the first inner frame and the first outer frame rotatably about a second rotational axis that extends in the width direction and that is provided below the first connection frame in the height direction. The first arm hydraulic cylinder has a first cylinder central axis along which the first arm hydraulic cylinder is configured to extend and contract to move the first arm assembly. The first cylinder central axis extends in a direction perpendicular to the second rotational axis. The first cover is configured to surround an outer periphery of the first arm hydraulic cylinder around the first cylinder central axis to cover the first opening and is provided on the first connection frame to be slidably guided by the first connection frame, the first inner projection, and the first outer projection.

According to another aspect of the present disclosure, a work vehicle includes a vehicle body frame, a first side cover, a first arm assembly, and a first arm hydraulic cylinder. The vehicle body frame includes a first connection frame, a first inner frame, and a first outer frame. The first connection frame has a first opening. The first inner frame has a second opening. The first outer frame has at least one third opening and is provided opposite to the first inner frame in a width direction along a width of the work vehicle. The first connection frame connects the first inner frame and the first outer frame to define a first internal space between the first inner frame and the first outer frame below the first connection frame in a height direction perpendicular to the width direction. The first internal space communicates with a first external space opposite to the first internal space with respect to the first outer frame through the second opening. The first inner space communicates with an engine chamber opposite to the first inner space with respect to the first inner frame through the at least one third opening. The first side cover is made of a perforated panel and is detachably attached to the first outer frame to cover the second opening. The first arm assembly is rotatably connected to the first inner frame and the first outer frame about a first rotational axis extending in the width direction. The first arm hydraulic cylinder is rotatably connected to the first inner frame and the first outer frame about a second rotational axis extending in the width direction to pass through the first opening such that the first arm hydraulic cylinder overlaps with the second opening as viewed in the width direction. The first arm hydraulic cylinder has a first cylinder central axis along which the first arm hydraulic cylinder is configured to extend and contract to move the first arm assembly. The first cylinder central axis extends in a cylinder axis direction perpendicular to the second rotational axis.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings.

DESCRIPTION OF THE EMBODIMENTS

Figure 1:
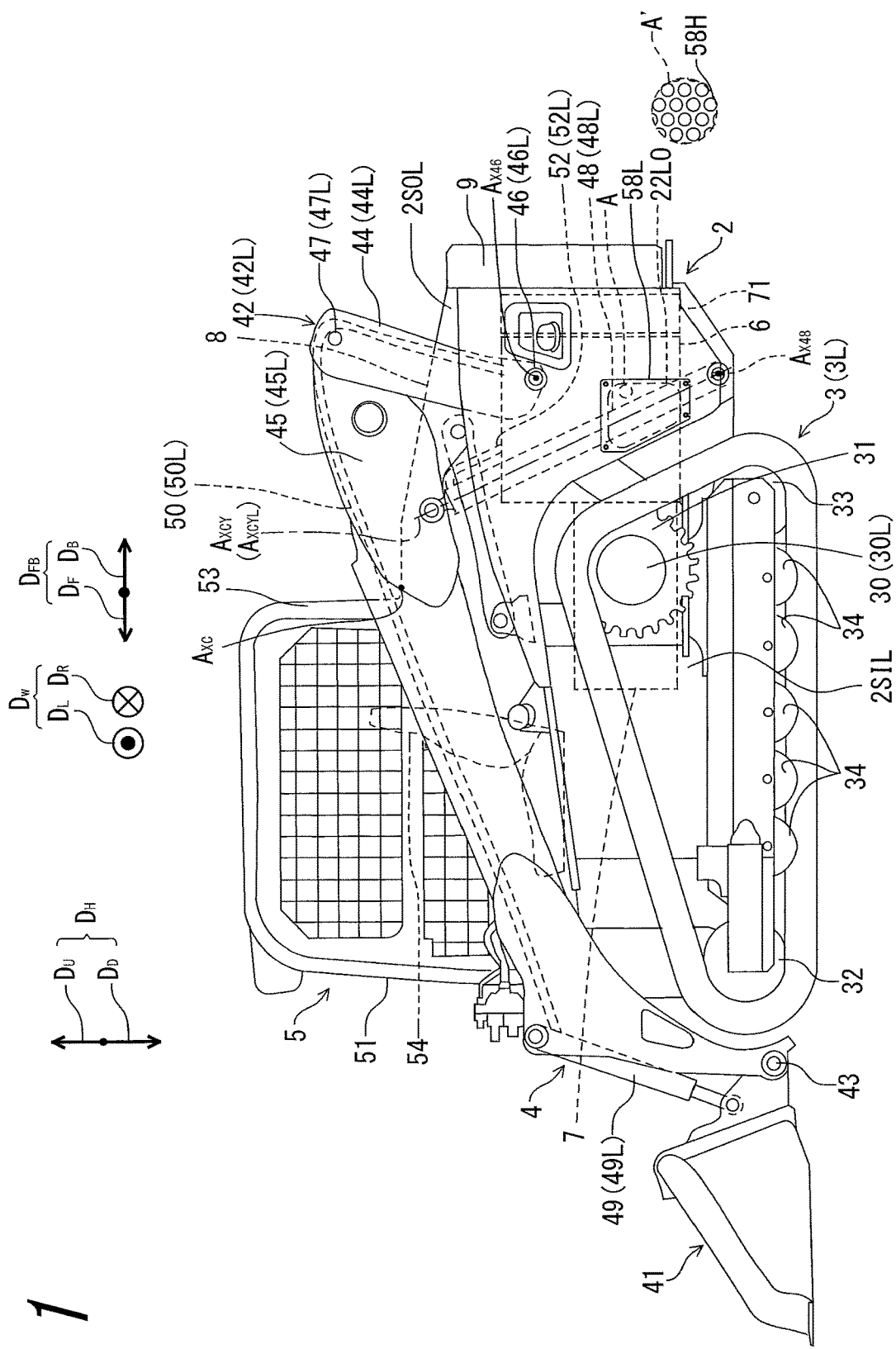
FIG. 1 is a side view of the work vehicle.

Hereinafter, the present invention will be described in detail with reference to the drawings showing embodiments thereof. In the drawings, the same reference numerals denote corresponding or substantially identical configurations.

Exemplary Embodiment

<Overall Configuration>

Figure 2:
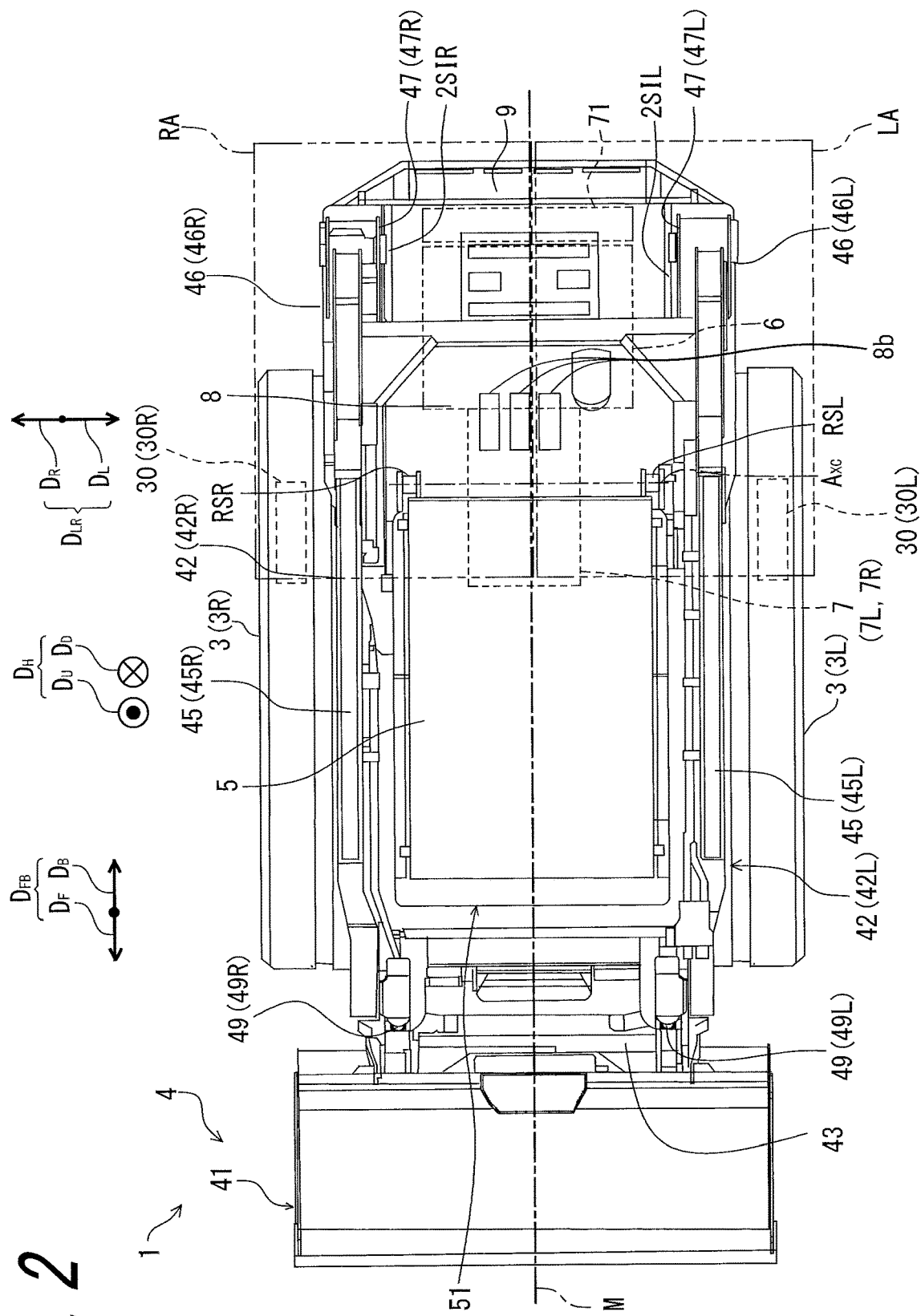
FIG. 2 is a top view of the work vehicle.
Figure 14:
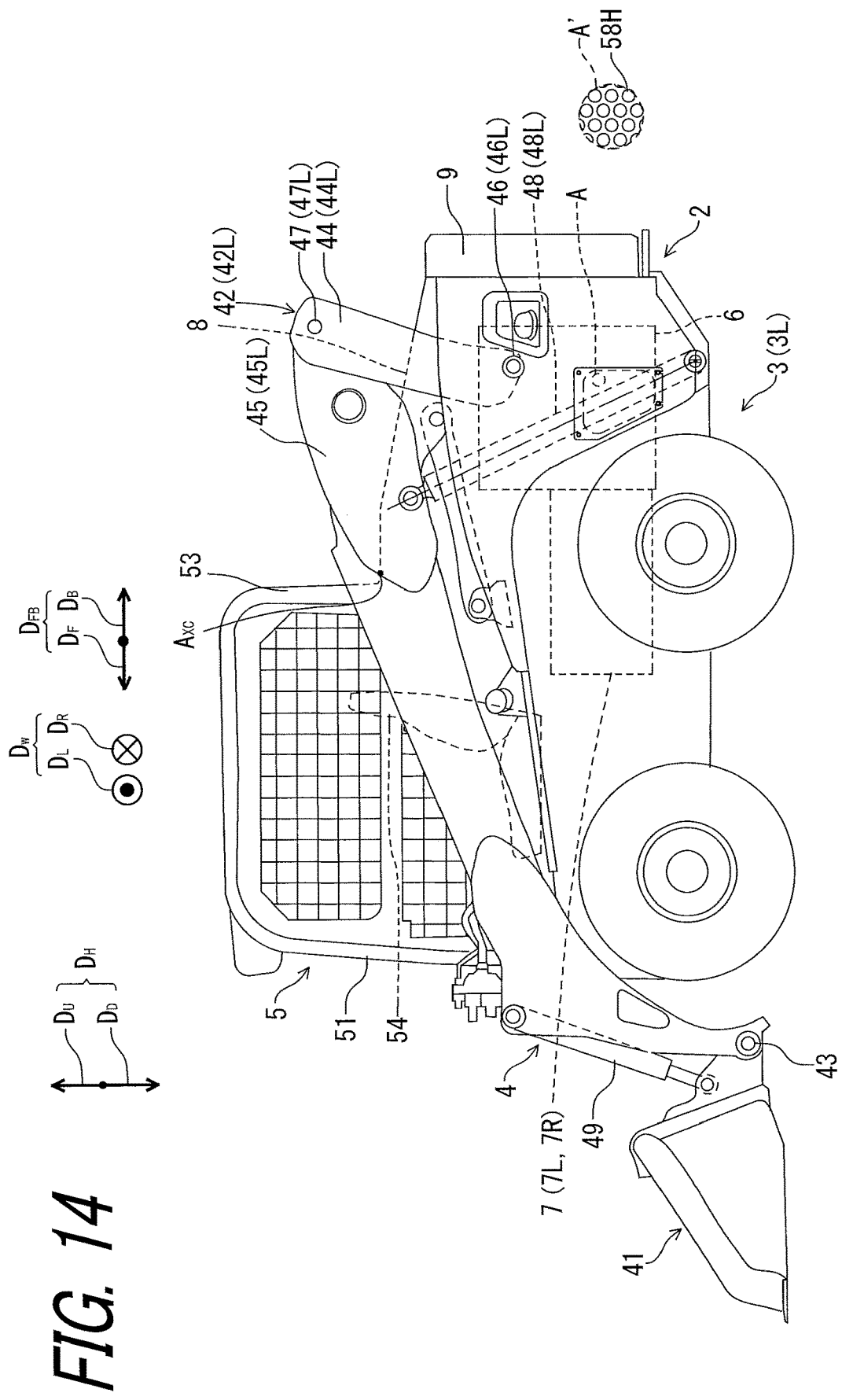
FIG. 14 is another example of a side view of work vehicle.

Referring to FIGS. 1 and 2, a work vehicle 1, such as a compact truck loader, includes a vehicle body frame 2, a pair of traveling devices 3, and a work device 4. The vehicle body frame 2 supports a traveling device 3 and a work device 4. In the illustrated embodiment, the traveling device 3 is a crawler traveling device. Therefore, each of the pair of traveling devices 3 includes a drive wheel 31 driven by the hydraulic motor device 30, driven wheels 32 and 33, and a rolling wheel 34. However, each of the pair of traveling devices 3 is not limited to a crawler traveling device. Each of the pair of traveling devices 3 may be a front wheel/rear wheel traveling device or a traveling device having a front wheel and a rear crawler, as shown in FIG. 14, for example. The work device 4 includes a work implement 41 at the distal end of the work device 4. In FIGS. 1 and 2, a work implement 41 is illustrated as a bucket, however, the work implement 41 is not limited to a bucket, and is more preferably a tree grinding machine utilized for marcher operations. The proximal end of the work device 4 is attached to the rear portion of the vehicle body frame 2. The work device 4 includes a pair of arm assemblies 42 for swingably supporting a work implement 41 and a work implement 41 via a pivot shaft 43. Each of the pair of arm assemblies 42 is coupled to a lift link 44 and an arm 45.

The lift link 44 includes is rotatable relative to the vehicle body frame 2 about the longitudinal axis of the fulcrum shaft 46. The arm 45 is rotatable about a joint shaft 47 with respective to the lift link 44. The work device 4 further includes a plurality of arm cylinders (arm hydraulic cylinders) 48 and at least one working tool cylinder 49. Each of the arm cylinders 48 is connected to the vehicle body frame 2 and the arm 45 so as to be rotatable about a second rotational axis $A_{X48}$ extending in the width direction $D_W$, and raises and lowers a work implement 41. The at least one working tool cylinder 49 is configured to tilt the work implement 41 with respect to the pair of arm assemblies 42. The vehicle body frame 2 includes a cabin 5. The cabin 5 is provided with a front window 51 which can be opened and closed, and an outer shape thereof is defined by a cab frame 53. The front window 51 may be omitted. The work vehicle 1 includes a driver seat 54 in a cabin 5. The cab frame 53 is rotatable about rotational shafts RSL and RSR on the vehicle body frame 2, as shown in FIG. 2. FIGS. 1 and 2 illustrates a common pivot $A_{XC}$ defined by rotational shafts RSL and RSR. That is, the cab frame 53 is attached to the vehicle body frame 2 so as to be rotatable about the pivot axis $A_{XC}$.

In the embodiment according to the present application, a front-back direction $D_{FB}$ (forward direction $D_F$/backward direction $D_B$) means a front-back direction (forward direction/backward direction) as seen from an operator seated on the driver seat 54 of the cabin 5. A leftward direction $D_L$, a rightward direction $D_R$, a width direction $D_W$ means the left direction, the right direction, and the left-right direction as viewed from the operator, respectively. An upward direction $D_U$, a downward direction $D_D$, height direction $D_H$ means an upward direction, a downward direction, and a height direction as viewed from the operator. The height direction $D_H$ is along the height of the work vehicle 1. The front-back, left-right (width), and up-down (height) directions of the work vehicle 1 coincide with the front-back, left-right (width), and up-down (height) directions as viewed from the operator, respectively. A width direction $D_W$ is perpendicular to the height direction $D_H$ and along the width of the work vehicle 1. The front-back direction $D_{FB}$ is perpendicular to the height direction $D_H$ and the width direction $D_W$.

FIG. 1 shows the left side of the work vehicle 1. As shown in FIG. 2, the vehicle body frame 2 is substantially symmetrical with respect to the vehicle body center plane M. Among the pair of traveling devices 3, the traveling device 3 provided on the left side is shown as a first traveling device 3L, and the traveling device 3 provided on the right side is shown as a second traveling device 3R. Among the pair of arm assemblies 42, the arm assembly 42 provided on the left side with respect to the vehicle body center plane M is shown as the first arm assembly 42L, and the arm assembly 42 provided on the right side with respect to the vehicle body center plane M is shown as the second arm assembly 42R. The lift link 44 provided on the left side of the vehicle body center plane M is shown as a first lift link 44L. An arm 45 provided on the left side of the vehicle body center plane M is shown as a first arm 45L, and an arm 45 provided on the right side of the vehicle body center plane M is shown as a second arm 45R. The fulcrum shaft 46 provided on the left side of the vehicle body center plane M is shown as a first fulcrum shaft 46L, a fulcrum shaft 46 provided on the right side with respect to the vehicle body center plane M is shown as a second fulcrum shaft 46R. A joint shaft 47 provided on the left side with respect to the vehicle body center plane M is shown as a first joint shaft 47L, and a joint shaft 47 provided on the right side with respect to the vehicle body center plane M is shown as a second joint shaft 47R. Among the hydraulic motor devices 30, the hydraulic motor device 30 provided on the left side with respect to the vehicle body center plane M is the first hydraulic motor device 30, and the hydraulic motor device 30 provided on the right side with respect to the vehicle body center plane M is shown as a second hydraulic motor device 30R. In FIG. 1, among the plurality of arm cylinders 48, an arm cylinder 48 provided on the left side with respect to the vehicle body center plane M is shown as a first arm cylinder (a first arm hydraulic cylinder) 48L. The first arm cylinder 48L drives the first arm assembly 42L by changing the length along the first cylinder central axis $A_{XCYL}$ extending in the radial direction with respect to the second rotational axis $A_{X48}$, thereby lifting and lowering the work implement 41. In FIG. 2, among at least one working tool cylinder 49, a working tool cylinder 49 provided on the left side with respect to the vehicle body center plane M is shown as a first working tool cylinder 49L. Among at least one working tool cylinder 49, a working tool cylinder 49 provided on the right side with respect to the vehicle body center plane M is shown as a second working tool cylinder 49R. The first working tool cylinder 49L is configured to tilt the work implement 41 with respect to the first arm assembly 42L. The second working tool cylinder 49R is configured to tilt the work implement 41 with respect to the second arm assembly 42R.

Referring to FIGS. 1 and 2, the work vehicle 1 further includes an engine 6 provided at the rear portion of the vehicle body frame 2 and a hydraulic pump/valve unit 7. The engine 6 drives the hydraulic pump/valve unit 7. The hydraulic pump/valve unit 7 is configured to discharge hydraulic fluid for driving the hydraulic motor device 30 for driving the drive wheel 31. The hydraulic pump/valve unit 7 is configured to discharge hydraulic fluid for driving a hydraulic actuator (a plurality of arm cylinders 48, at least one working tool cylinder 49, etc.) connected to the work device 4. The plurality of arm cylinders 48 and the hydraulic pump/valve unit 7 are connected by a plurality of arm cylinder hydraulic hoses 52. The hydraulic fluid from the hydraulic pump/valve unit 7 is supplied to the oil chambers of the plurality of arm cylinders 48 through the arm cylinder hydraulic hoses 52. Specifically, the first arm cylinder 48L and the hydraulic pump/valve unit 7 are connected by a first arm cylinder hydraulic hose 52L. The at least one working tool cylinder 49 and the hydraulic pump/valve unit 7 are connected by at least one working tool cylinder hydraulic hose 50. Specifically, the first working tool cylinder 49L and the hydraulic pump/valve unit 7 are connected by at least one first working tool cylinder hydraulic hose 50L. The second working tool cylinder 49R and the hydraulic pump/valve unit 7 are connected by at least one second working tool cylinder hydraulic hose 50R. The engine 6 is provided between a pair of arm assemblies 42 in the width direction $D_W$ of the work vehicle 1. The work vehicle 1 further includes a bonnet cover 8 for covering the engine 6. The work vehicle 1 further includes a rear cover 9 provided at the rear end of the vehicle body frame 2. The rear cover 9 is openable and closable, and thus maintenance personnel can perform maintenance work on the engine 6 and the like.

Figure 3:
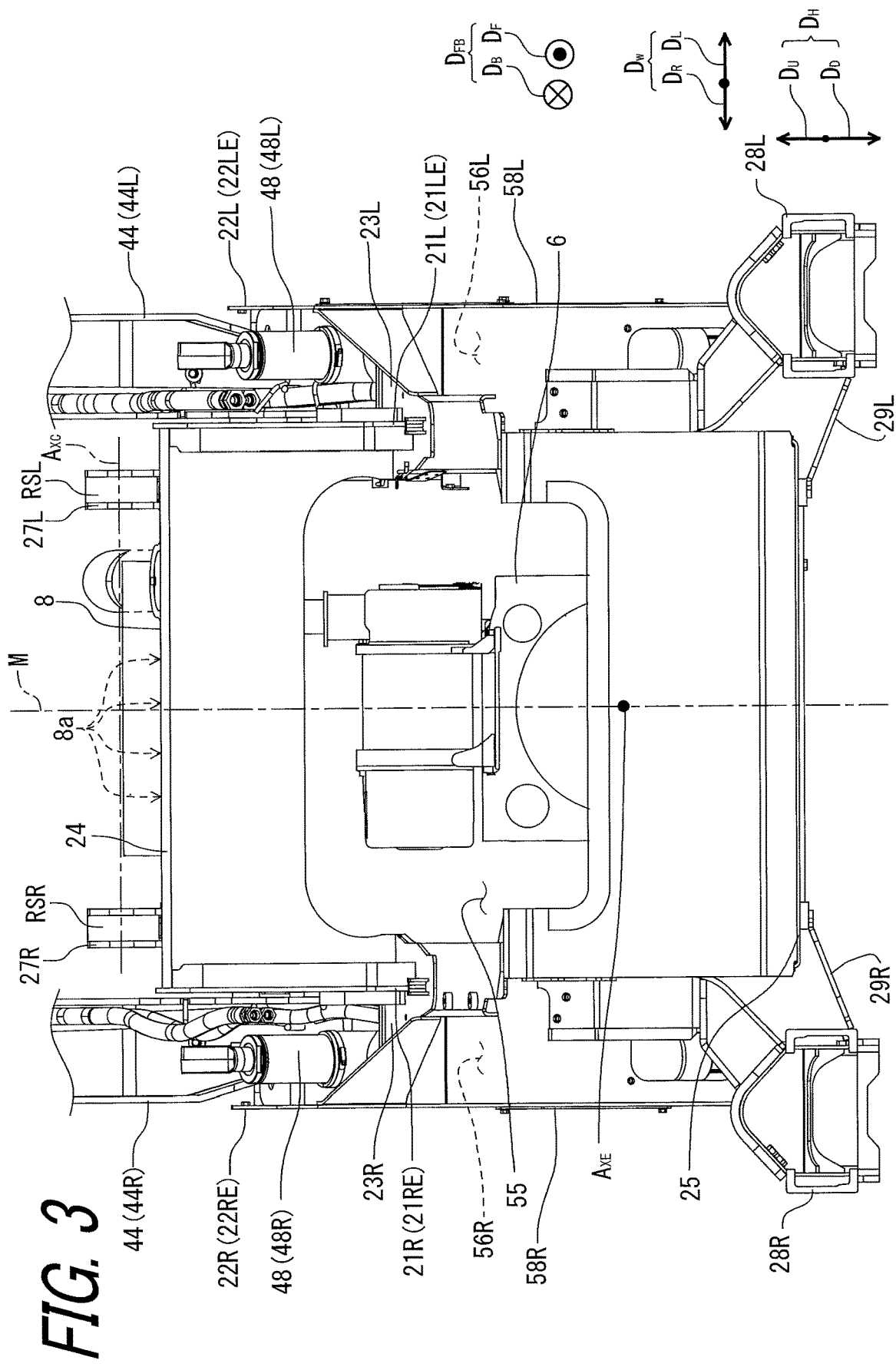
FIG. 3 is a view of a part of the work vehicle viewed from the front end of the work vehicle toward the rear.

FIG. 3 is a view of a part of the work vehicle 1 viewed from the front end of the work vehicle 1 toward the rear $D_B$. In FIG. 3, illustration of a pair of traveling devices 3, a cabin 5, an arm 45, and a work implement 41 are omitted. Referring to FIG. 3, the vehicle body frame 2 includes a first inner frame 21L, second inner frame 21R, a first outer frame 22L, a second outer frame 22R, a first connection frame 23L, a second connection frame 23R, an upper frame 24, a lower frame 25, a first track frame 28L, and a second track frame 28R.

The first inner frame 21L and the second inner frame 21R connect the upper frame 24 and the lower frame 25 and extend in the height direction $D_H$. The first outer frame 22L faces the first inner frame 21L in the width direction $D_W$ and extends in the height direction $D_H$. The second outer frame 22R faces the second inner frame 21R in the width direction $D_W$ and extends in the height direction $D_H$. The first inner frame 21L and the first outer frame 22L are positioned on the left side with respect to the vehicle body center plane M. The second inner frame 21R and the second outer frame 22R are positioned on the right side with respect to the vehicle body center plane M. The first inner frame 21L is positioned between the first outer frame 22L and the vehicle body center plane M in the width direction $D_W$. The second inner frame 21R is positioned between the second outer frame 22R and the vehicle body center plane M in the width direction $D_W$.

The first connection frame 23L connects the first inner frame 21L and the first outer frame 22L. The second connection frame 23R connects the second inner frame 21R and the second outer frame 22R. The lower frame 25 connects the lower end of the first inner frame 21L and the lower end of the second inner frame 21R. The upper frame 24 is an upper end of the first inner frame 21L and an upper end of the second inner frame 21R. The upper frame 24 is opposed to the lower frame 25 in the height direction $D_H$. The upper frame 24 has a first support portion 27L for rotatably supporting the rotational shaft RSL described above, and a second support portion 27R for rotatably supporting the rotational shaft RSR described above. Here, a space surrounded by the cabin 5, the first inner frame 21L, the second inner frame 21R, the upper frame 24, the lower frame 25, the bonnet cover 8, and the rear cover 9 is called an engine chamber 55. That is, the second inner frame 21R is provided on the side opposite to the first inner frame 21L with respect to the engine chamber 55.

A first lift link 44L and a first arm 45L constituting a first arm assembly 42L, and a first arm cylinder 48L for actuating the first arm assembly 42L are provided between a first inner frame 21L and a first outer frame 22L in the width direction $D_W$, and are connected to the first inner frame 21L and the first outer frame 22L. The first support shaft 46LE which supports the first lift link 44L extends in the width direction $D_W$ and is connected to the first inner frame 21L and the first outer frame 22L. In other words, the first arm assembly 42L is connected to the first inner frame 21L and the first outer frame 22L so as to be rotatable about a first rotational axis $A_{X46}$ which is the central axis of the first fulcrum shaft 46L and extends in the width direction $D_W$. The second lift link 44R and the second arm 45R constituting the second arm assembly 42R, and the second arm cylinder (second arm hydraulic cylinder) 48R for actuating the second arm assembly 42R are disposed between the second inner frame 21R and the second outer frame 22R in the width direction $D_W$. The second fulcrum shaft 46R for supporting the second lift link 44R extends in the width direction $D_W$ and is connected to the second inner frame 21R and the second outer frame 22R. That is, the second arm assembly 42R is connected to the second inner frame 21R and the second outer frame 22R so as to be rotatable about the first rotational axis $A_{X46}$ which is the central axis of the second fulcrum shaft 46R and extends in the width direction $D_W$. The second arm cylinder 48R is connected to the second inner frame 21R and the second outer frame 22R so as to be rotatable about the second rotational axis $A_{X48}$.

The first track frame 28L is attached to the lower frame 25 via a first attachment frame 29L. The second track frame 28R is attached to the lower frame 25 via a second attachment frame 29R. Driven wheels 32 and 33 and a rolling wheel 34 are rotatably mounted on the first track frame 28L and the second track frame 28R. The drive wheel 31 is supported by the vehicle body frame 2. The engine 6 is supported by the lower frame 25 via a damper (not illustrated). In FIG. 3, in order to define the orientation of the engine 6, the crankshaft $A_{XE}$ of the engine 6 is illustrated. The crankshaft $A_{XE}$ extends in the front-back direction $D_{FB}$ on the vehicle body center plane M.

Figure 4:
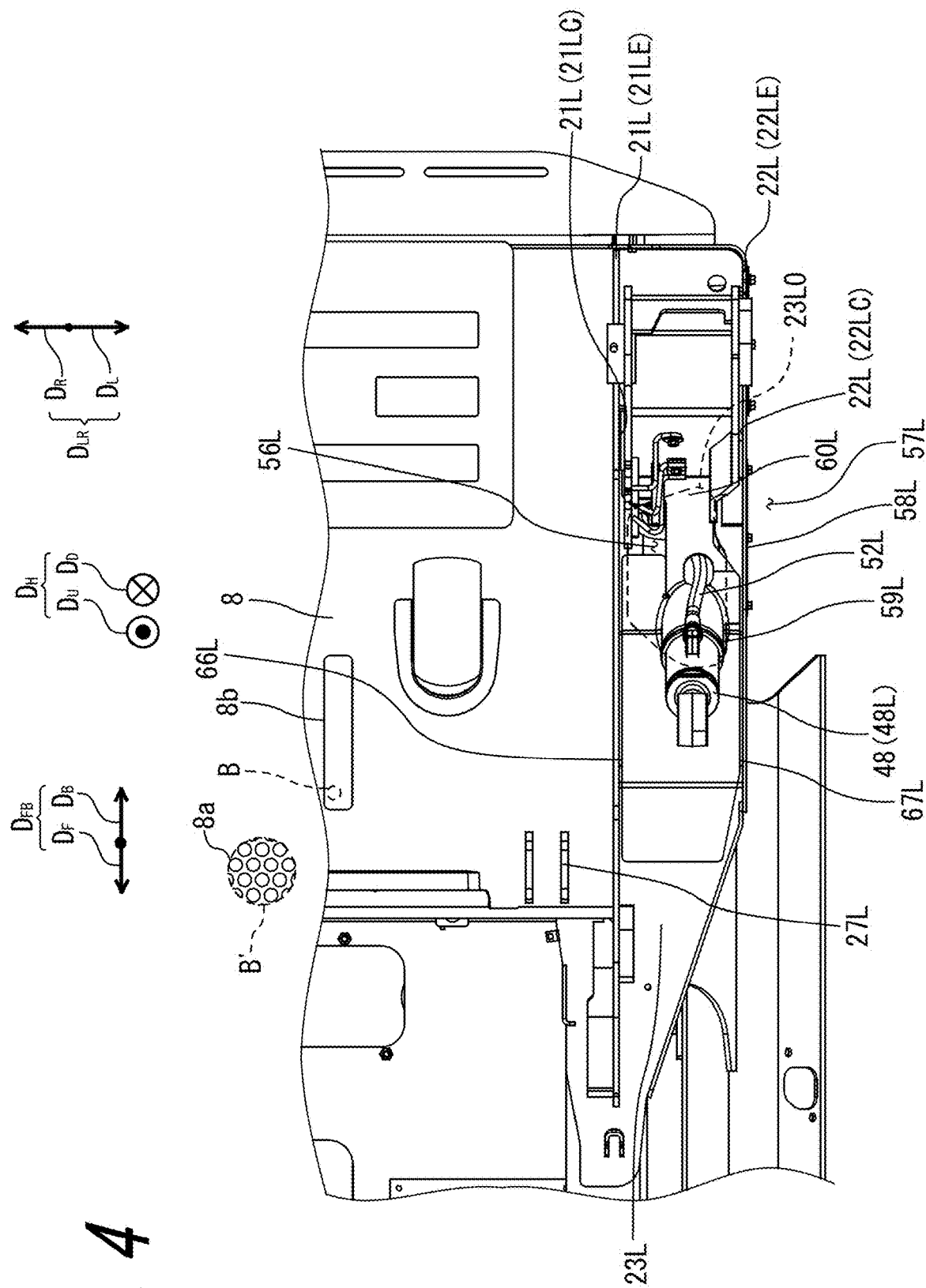
FIG. 4 is an enlarged top view of a portion of the work vehicle.
Figure 5:
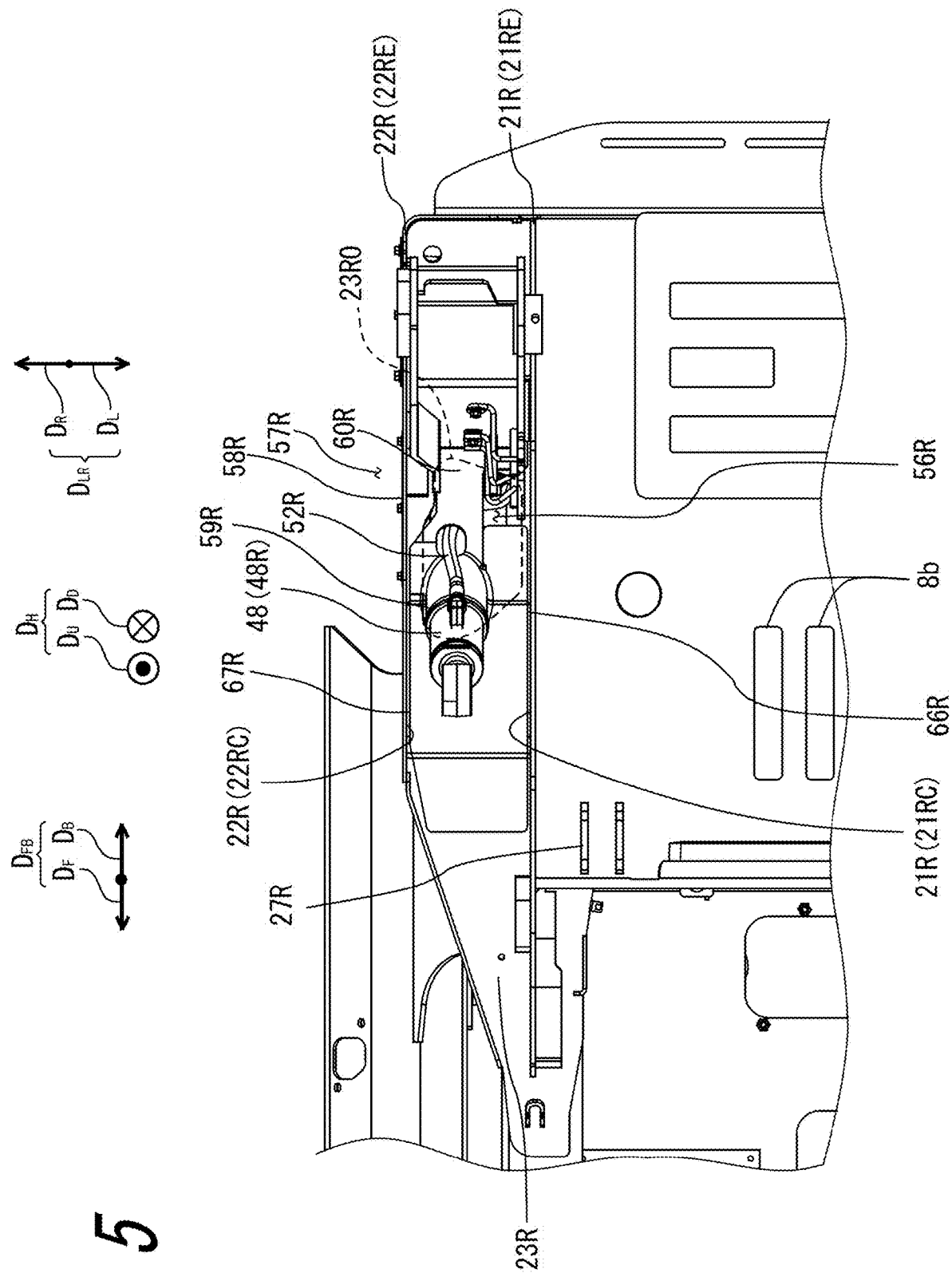
FIG. 5 is an enlarged top view of a portion of the work vehicle.

FIG. 4 is an enlarged view of the region LA in FIG. 2. FIG. 5 is an enlarged view of the region RA in FIG. 2. In FIGS. 4 and 5, illustrations of the parts of the first arm assembly 42L excluding the first lift link 44L, the parts of the second arm assembly 42R excluding the second lift link 44R, the pair of traveling devices 3, the working tool cylinder hydraulic hose and the cabin 5 are omitted. Referring to FIG. 4, the first connection frame 23L includes a first opening 23LO. The work vehicle 1 includes a first cover 60L which is provided on a first connection frame 23L and covers a first opening 23LO. The first cover 60L is configured of a sheet of elastic member. Referring to FIG. 5, the second connection frame 23R includes a fourth opening 23RO. The work vehicle 1 is provided with a second cover provided on a second connection frame 23R and covering a fourth opening 23RO. The second cover 60R is formed of a sheet of an elastic member.

Figure 6:
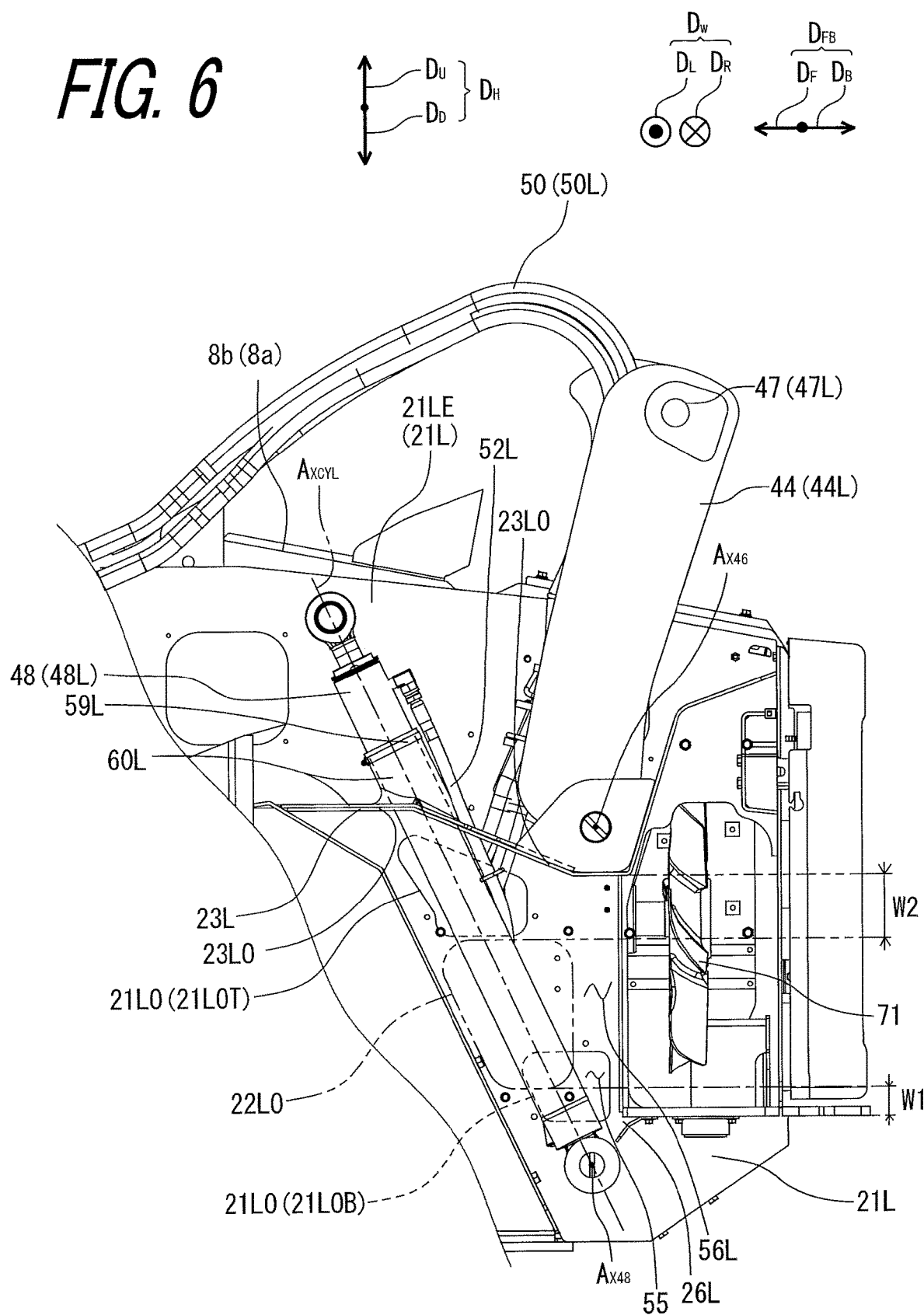
FIG. 6 is a left side view of a portion of work vehicle.

FIG. 6 is a left side view of the work vehicle 1 in which the first outer frame 22L and the first arm 45L are removed. Referring to FIG. 6, the first arm cylinder 48L is provided so as to pass through the first opening 23LO. The work vehicle 1 further includes at least one first arm cylinder hydraulic hose 52L connected to the first arm cylinder 48L and penetrating the first opening 23LO. At least one first working tool cylinder hydraulic hose penetrates the first opening 23LO. The first inner frame 21L includes a first inner projection 21LE provided above the first connection frame 23L in the height direction $D_H$. Referring to FIGS. 4 and 6, the first cover 60L surrounds the outer periphery of the first arm cylinder 48L around the first cylinder central axis $A_{XCYL}$.

Figure 7:
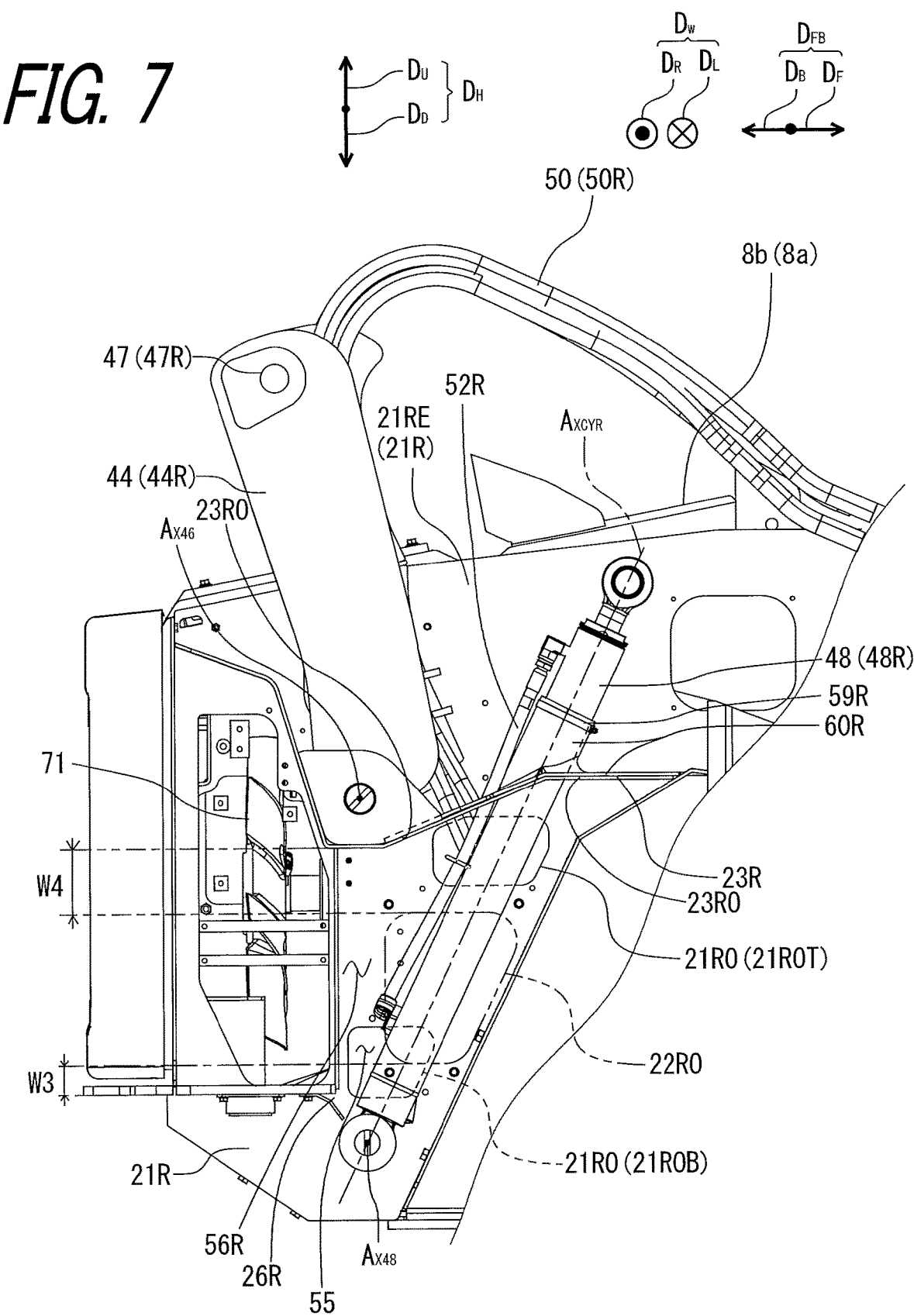
FIG. 7 is a right side view of a portion of work vehicle.

FIG. 7 is a right side view of the work vehicle 1 in which the second outer frame 22R and the second arm 45R are removed. Referring to FIG. 7, the second inner frame 21R includes a second inner projection 21RE provided above the second connection frame 23R in the height direction $D_H$. The work vehicle 1 further comprises at least one second arm cylinder hydraulic hose 52R connected to the second arm cylinder 48R and passing through the fourth opening 23RO. At least one second working tool cylinder hydraulic hose 50R passes through the fourth opening 23RO. The second arm cylinder 48R is disposed so as to pass through the fourth opening 23RO. The second arm cylinder 48R is configured to drive the second arm assembly 42R by changing the length along the second cylinder central axis $A_{XCYR}$ extending in the radial direction with respect to the second rotational axis $A_{X48}$. Referring to FIGS. 5 and 7, the second cover 60R surrounds the outer periphery of the second arm cylinder 48R around the second cylinder central axis $A_{XCYR}$.

Figure 8:
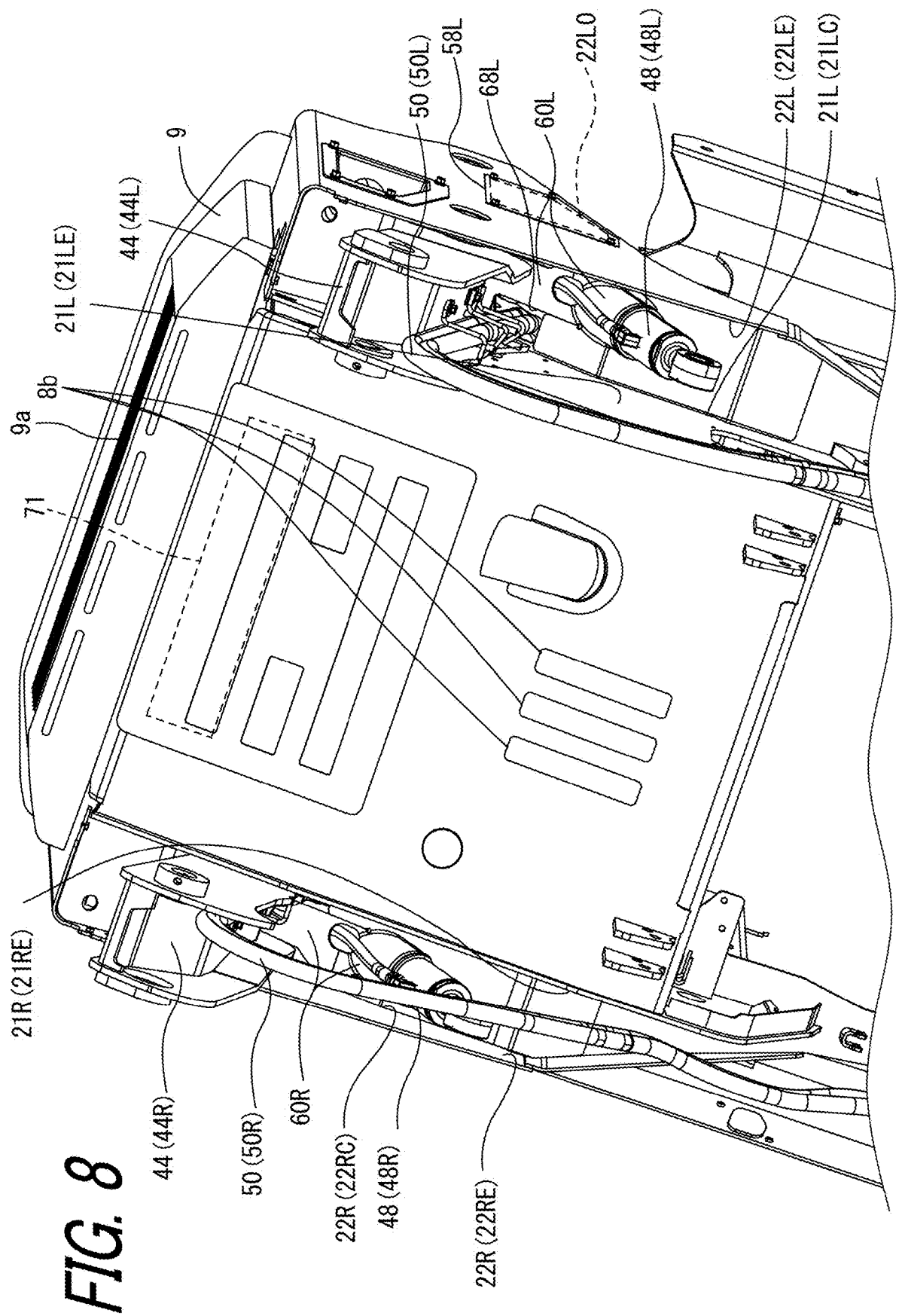
FIG. 8 is a perspective view of a portion of the work vehicle.
Figure 9:
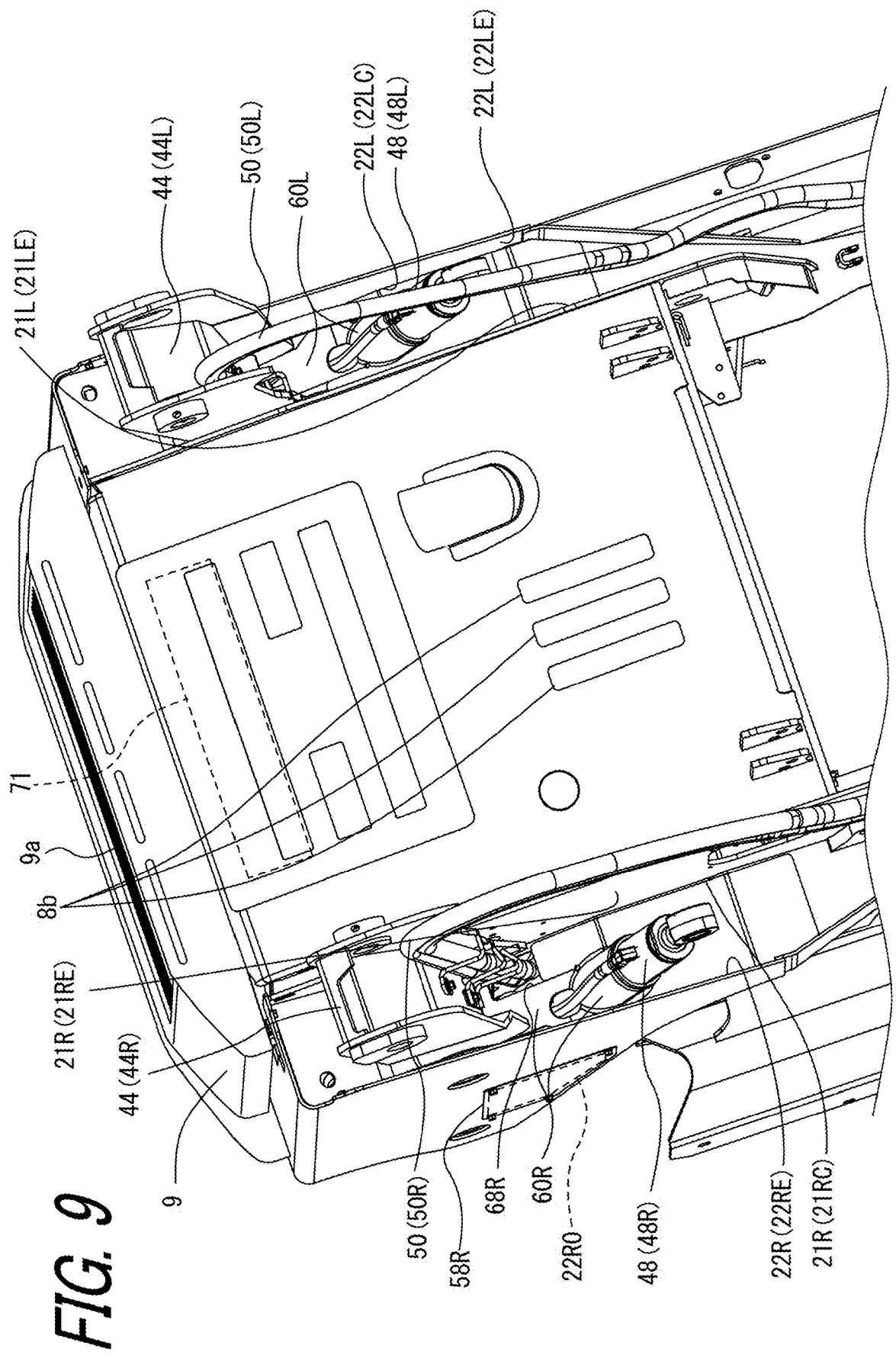
FIG. 9 is a perspective view of a portion of the work vehicle.

FIG. 8 is a perspective view of the work vehicle 1 in which the cabin 5, the first arm 45L and the second arm 45R are removed. FIG. 9 is a perspective view of the work vehicle 1 in which the cabin 5, the first arm 45L, and the second arm 45R are removed, as viewed from a direction different from FIG. 8. Referring to FIGS. 4 and 8, the first inner frame 21L includes a first connection 21LC and the first inner projection 21LE projecting above from the first connection 21LC in the height direction $D_H$. The first connection frame 23L is connected to the first connection 21LC. Referring to FIGS. 5 and 9, the second inner frame 21R includes a third connection 21RC and the second inner projection 21RE projecting above from the third connection 21RC in the height direction $D_H$. The second connection frame 23R is connected to the third connection 21RC. Referring to FIGS. 3, 4, and 9, the first outer frame 22L includes a first outer projection 22LE provided above the first connection frame 23L in the height direction $D_H$. The first outer frame 22L includes a second connection 22LC and the first outer projection 22LE projecting above from the second connection 22LC in the height direction $D_H$. The first connection frame 23L is connected to the second connection 22LC. The first cover 60L is slidably guided by the first inner projection 21LE, the first outer projection 22LE, and the first connection frame 23L. Referring to FIGS. 3, 5 and 8, the second outer frame 22R includes a second outer projection 22RE provided above the second connection frame 23R in the height direction $D_H$. The second outer frame 22R includes a fourth connection 22RC and the second outer projection 22RE projecting above from the fourth connection 22RC in the height direction $D_H$. The second connection frame 23R is connected to the fourth connection 22RC. The second cover 60R is slidably guided by the second inner projection 21RE, the second outer projection 22RE, and the second connection frame 23R.

Figure 10:
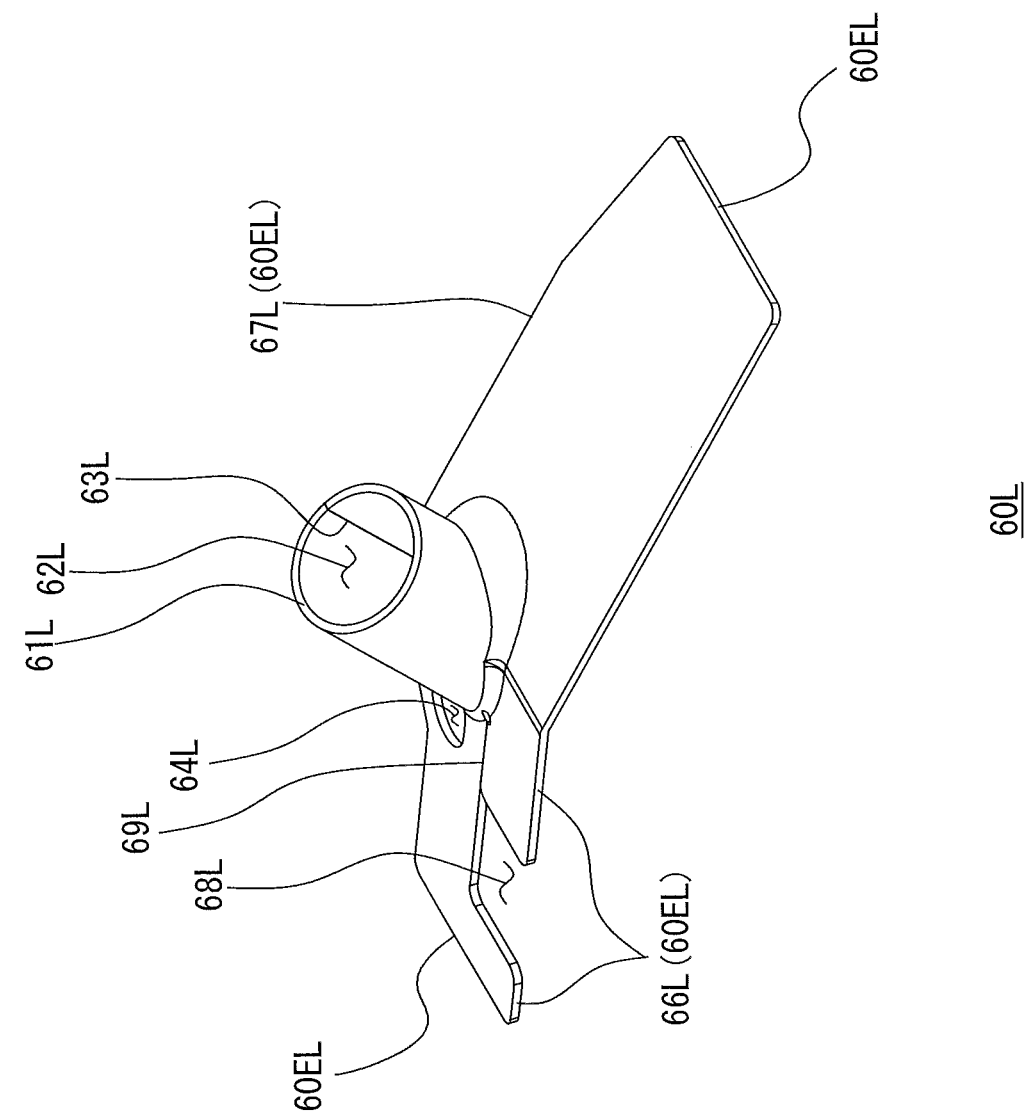
FIG. 10 is a perspective view of a first cover.
Figure 11:
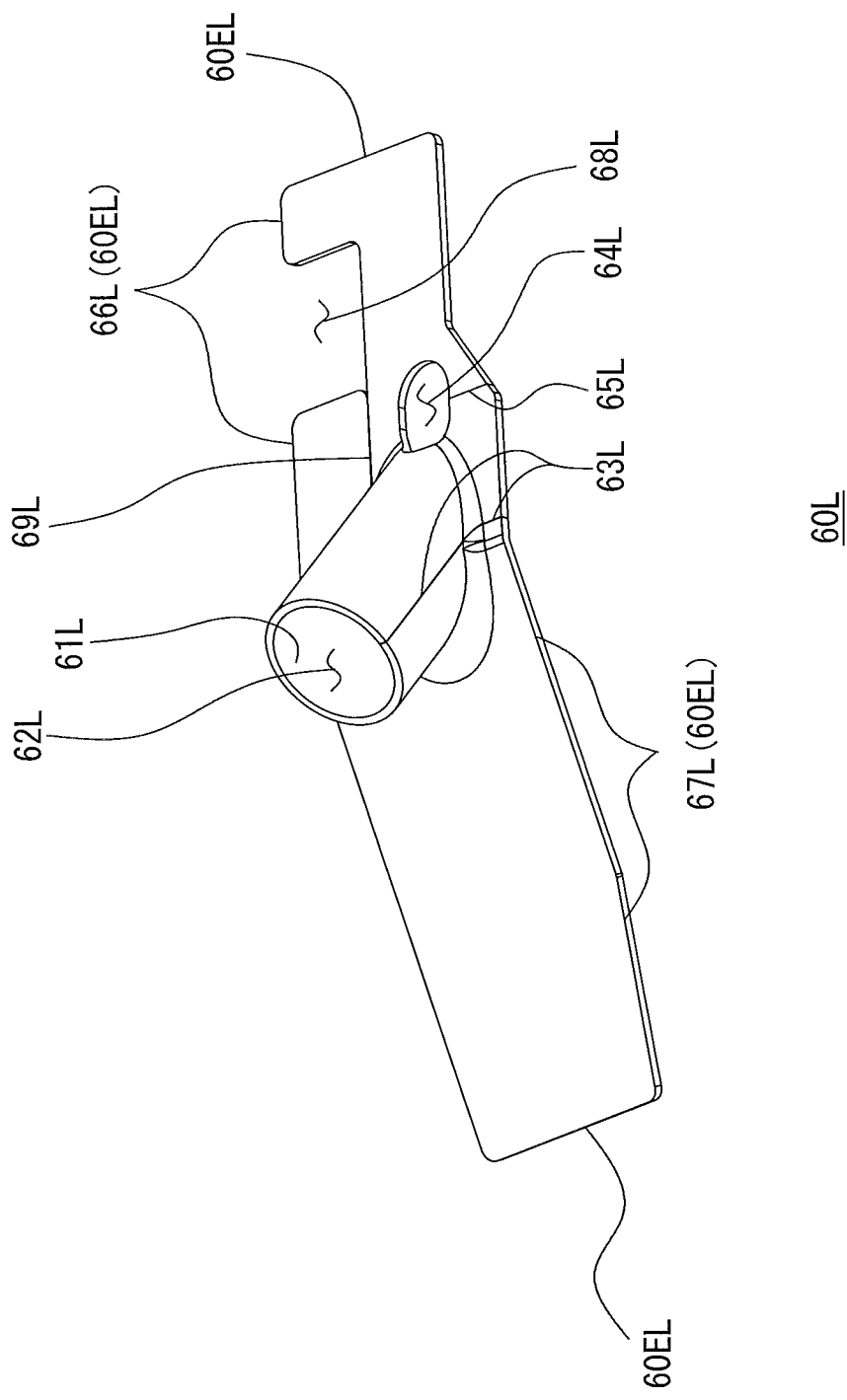
FIG. 11 is a perspective view of a first cover.

FIG. 10 is a perspective view of the first cover 60L. FIG. 11 is a perspective view of the first cover 60L viewed from a direction different from that of FIG. 10. Referring to FIG. 10 and FIG. 11, the first cover 60L includes a first pipe portion 61L, a first cylinder insertion hole 62L, and a first cylinder insertion cut 63L, a first hose insertion hole 64L, a first hose insertion cut 65L, a first inner side 66L, a first outer side 67L, and a first recess portion 68L, and a first stress dispersion notch 69L. The first pipe portion 61L has a tubular shape and is configured to surround the outer periphery of the first arm cylinder 48L around the first cylinder central axis $A_{XCYL}$. The first cylinder insertion hole 62L is provided inside the first pipe portion 61L. As shown in FIGS. 4 and 6, the first arm cylinder 48L passes through the first cylinder insertion hole 62L. The first cylinder insertion cut 63L extends from a side 60EL (first outer side 67L) of the sheet of the first cover 60L to the first cylinder insertion hole 62L. The first arm cylinder 48L can be inserted into the first cylinder insertion hole 62L via the first cylinder insertion cut 63L.

The first hose insertion hole 64L is provided close to the first pipe portion 61L. As shown in FIGS. 4 and 6, at least one first arm cylinder hydraulic hose 52L passes through the first hose insertion hole 64L. The first hose insertion cut 65L extends from a side 60EL (first outer side 67L) of the seat of the first cover 60L to the first hose insertion hole 64L. At least one first arm cylinder hydraulic hose 52L can be inserted into the first hose insertion hole 64L via the first hose insertion cut 65L. Referring to FIG. 4, the first inner side 66L can abut the first inner frame 21L. In other words, although the first inner side 66L may or may not come into contact with the first inner projection 21LE when the first cover 60L is mounted, the first inner side 66L comes into contact with the first inner projection 21LE when the first cover 60L slides, so that the posture of the first cover 60L during sliding is maintained. The first outer side 67L can abut against the first outer frame 22L. That is, although the first outer side 67L may or may not come into contact with the first outer projection 22LE when the first cover 60L is mounted, the first outer side 67L comes into contact with the first outer projection 22LE when the first cover 60L slides, so that the posture of the first cover 60L during sliding is maintained. The first recess portion 68L is recessed from the first inner side 66L. Referring to FIG. 8, at least one first working tool cylinder hydraulic hose 50L is disposed to pass through the first recess portion 68L.

When the first lift link 44L rotates forward, at least one of the working tool cylinder hydraulic hose 50L comes into contact with the first cover 60L, the first stress distribution notches 69L is divided into two parts from the first stress dispersion notch 69L, and the part that comes into contact with the first working tool cylinder hydraulic hose 50L bends forward. Thus, it is possible to prevent at least one first working tool cylinder hydraulic hose 50L from damaging the first cover 60L when the first lift link 44L cover 60L.

Referring to FIGS. 4 and 6, the work vehicle 1 further includes a first clamp 59L for fastening the outer periphery of the first arm cylinder 48L and the elastic member (first pipe portion 61L) of the first cover 60L around the first cylinder insertion hole 62L. The first arm cylinder 48L is inserted into the first cylinder insertion hole 62L via the first cylinder insertion cut 63L, and the first pipe portion 61L and the first arm cylinder 48L can be fixed by the first clamp 59L.

Figure 12:
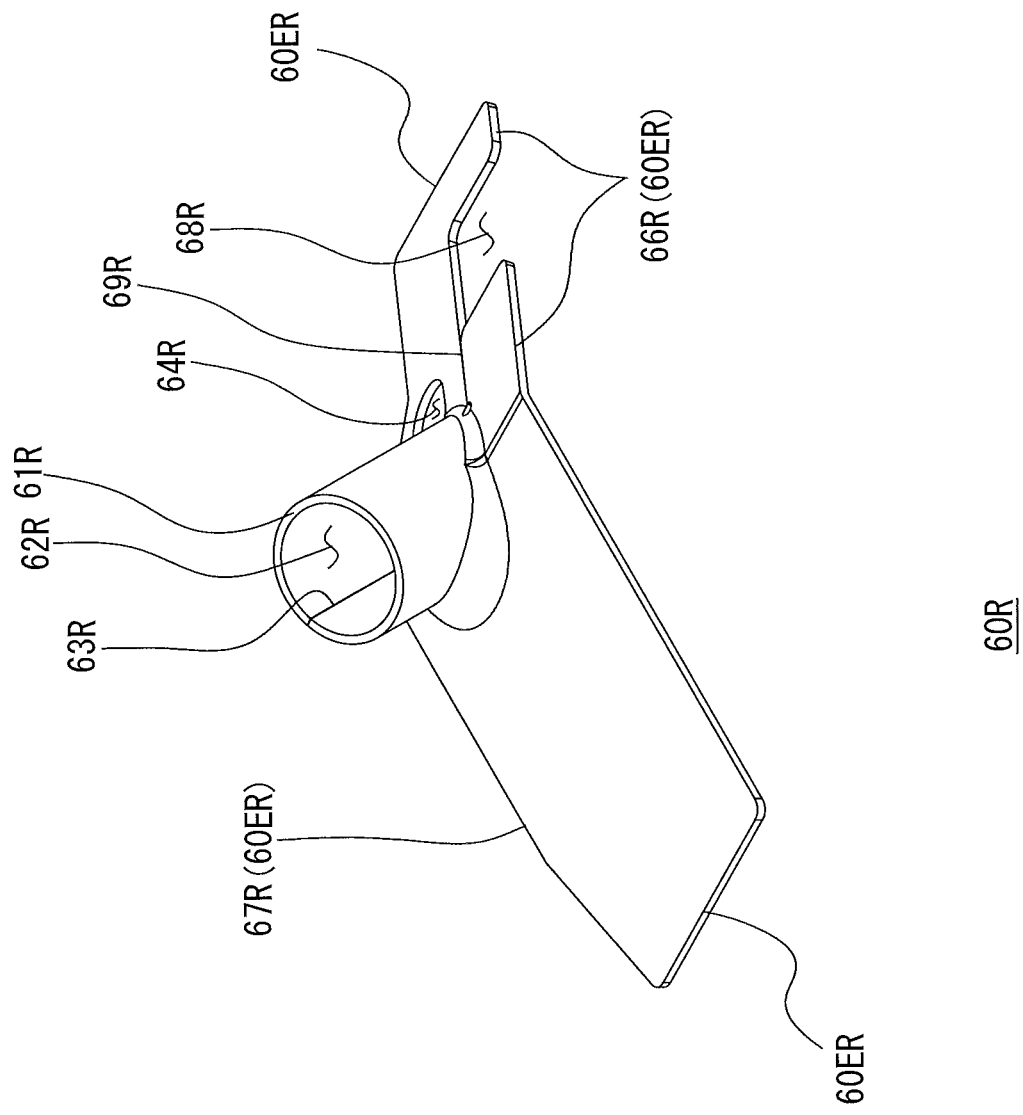
FIG. 12 is a perspective view of a second cover.
Figure 13:
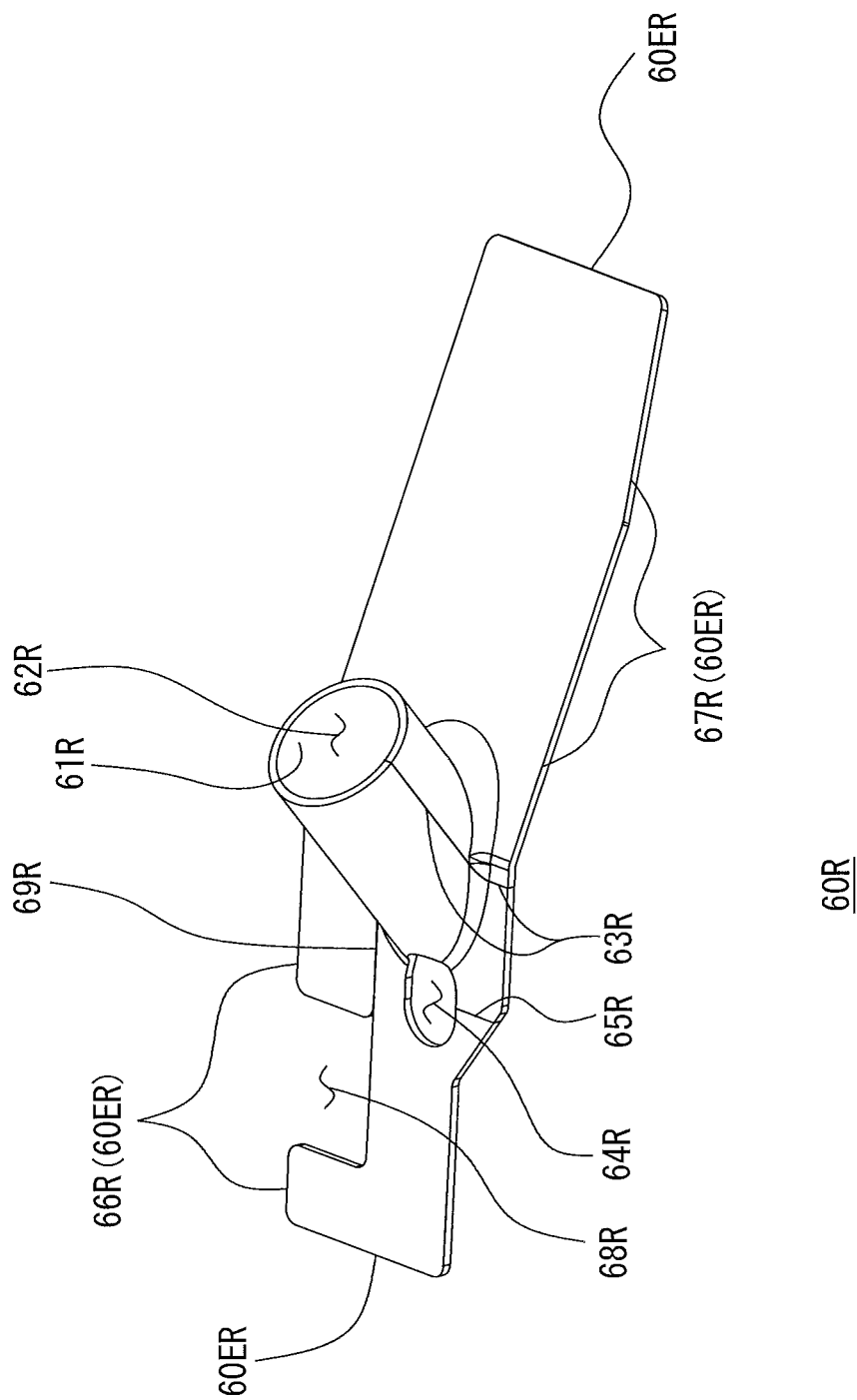
FIG. 13 is a perspective view of a second cover.

FIG. 12 is a perspective view of a second cover 60R. FIG. 13 is a perspective view of the second cover 60R viewed from a direction different from that of FIG. 12. Referring to FIGS. 12 and 13, the second cover 60R includes a second pipe portion 61R, a second cylinder insertion hole 62R, a second cylinder insertion cut 63R, a second hose insertion hole 64R, a second hose insertion cut 65R, a second inner side 66R, a second outer side 67R, a second recess portion 68R, and a second stress dispersion cut 69R. The second pipe portion 61R has a tubular shape and is configured to surround the outer periphery of the second arm cylinder 48R around the second cylinder central axis $A_{XCYR}$. The second cylinder insertion hole 62R is provided inside the second pipe portion 61R. As shown in FIGS. 5 and 7, the second arm cylinder 48R passes through the second cylinder insertion hole 62R. The second cylinder insertion cut 63R extends from a side 60ER (second outer side 67R) of the sheet of the second cover 60R to the second cylinder insertion hole 62R. The second arm cylinder 48R can be inserted into the second cylinder insertion hole 62R via the second cylinder insertion cut 63R.

The second hose insertion hole 64R is provided close to the second pipe portion 61R. As shown in FIGS. 5 and 7, at least one second arm cylinder hydraulic hose 52R penetrates the second hose insertion hole 64R. The second hose insertion cut 65R extends from a side 60ER (second outer side 67R) of the sheet of the second cover 60R to the second hose insertion hole 64R. At least one second arm cylinder hydraulic hose 52R can be inserted into the second hose insertion hole 64R via the second hose insertion cut 65R. Referring to FIG. 5, the second inner side 66R can abut the second inner frame 21R. The second outer side 67R can abut against the second outer frame 22R. The second recess portion 68R is recessed from the second inner side 66R. Referring to FIG. 9, at least one second working tool cylinder hydraulic hose 50R is disposed through the second recess portion 68R.

When at least one second working tool cylinder hydraulic hose 50R comes into contact with the second cover 60R when the second lift link 44R rotates forward, the second stress dispersion cut 69R is divided into two parts from the second stress dispersion cut 69R, and the part that comes into contact with the second working tool cylinder hydraulic hose bends forward. Thus, when the second lift link 44R rotates forward, it is possible to prevent at least one second working tool cylinder hydraulic hose 50R from damaging the second cover 60R.

Referring to FIGS. 5 and 7, the work vehicle 1 further includes a second clamp 59R for fastening the outer periphery of the second arm cylinder 48R and the elastic member (second pipe portion 61R) of the second cover 60R around the second cylinder insertion hole 62R. The second arm cylinder 48R is inserted into the second cylinder insertion hole 62R via the second cylinder insertion cut 63R, and the second pipe portion 61R and the second arm cylinder 48R can be fixed by the second clamp 59R.

<Cooling Structure of Engine Room>

Next, the cooling structure of the engine chamber 55 for cooling the heat generated by the engine 6 will be described. As shown in FIGS. 4 and 5, the bonnet cover 8 has a plurality of perforated panels 8b including an upper vent 8a. That is, the bonnet cover 8 covers the upper portion of the engine chamber 55 and has the upper vent 8a. In FIG. 4, an enlarged view of the region B of the perforated panel 8b is shown in the region B', but the upper vent 8a shown in the region B' exists in the entire region of the perforated panel 8b. The upper vent 8a preferably has a circular shape when viewed from the front face of the perforated panel 8b (through the thickness of the perforated panel 8b through which the upper vent 8a penetrates the perforated panel 8b). The diameter of the circle should preferably be smaller than the size of the main debris of the marcher operation (tree branches, leaves and sawdust).

Referring to FIGS. 1 and 4, the work vehicle 1 further includes a first side cover 58L which is detachably attached to the first outer frame 22L. Referring to FIGS. 1, 4, and 6, the first outer frame 22L includes a second opening 22LO which connects a first internal space 56L between the first outer frame 22L and the first outer frame 22L and a first outer space 57L opposite to the first internal space 56L with respect to the first outer frame 22L. In FIG. 1, the second opening 22LO on the back side of the first side cover 58L is indicated by a dotted line. In FIG. 6, since the display of the first outer frame 22L and the first side cover 58L is omitted, the second opening 22LO is shown by a two-dot chain line. As shown in FIG. 6, the second opening 22LO overlaps the first arm cylinder 48L as viewed in the width direction $D_W$. As shown in FIG. 1, the first side cover 58L comprises a perforated panel and is mounted to cover the second opening 22LO. In FIG. 1, the region A an enlarged view of the region A is shown in region A'. The first side cover 58L includes the pores 58H as in the region A' in the region overlapping the second opening 22LO. The pores 58H preferably have a circular shape when viewed from the front of the first side cover 58L (in the thickness direction of the perforated panel 8b through which the upper vent 8a penetrates the perforated panel 8b). The diameter of the circle should preferably be smaller than the size of the main debris of the marcher operation (tree branches, leaves and sawdust). Referring to FIG. 6, the vehicle body frame 2 further includes a first bottom frame 26L for connecting the first inner frame 21L and the first outer frame 22L below the first connection frame 23L in the height direction $D_H$. The second opening 22LO is provided closer to the first bottom frame 26L than the first connection frame 23L in the height direction $D_H$. Specifically, the distance W1 between the lower end of the second opening 22LO and the upper end of the first bottom frame 26L in the height direction $D_H$ is shorter than the distance W2 between the lower end of the first connection frame 23L and the upper end of the second opening 22LO in the height direction $D_H$. The first inner frame 21L includes at least one third opening 21LO for communicating the first internal space 56L with an engine chamber 55 opposite to the first internal space 56L with respect to the first inner frame 21L. At least one third opening 21LO includes a third upper opening 21LOT provided above the second opening as viewed in the width direction $D_W$ and a third lower opening 21LOB provided below the second opening 22LO as viewed in the width direction $D_W$.

Referring to FIG. 9, the work vehicle 1 further includes a second side cover 58R which is detachably attached to the second outer frame 22R. Referring to FIGS. 9, 5 and 7, the second outer frame 22R includes a fifth opening 22RO for communicating a second internal space 56R between the second inner frame 21R and the second outer frame 22R, the second outer frame 22R and a second outer space 57R opposite to the second internal space 56R with respect to the second outer frame 22R. In FIG. 9, the fifth opening 22RO on the back side of the second side cover 58R is indicated by a dotted line. In FIG. 7, since the display of the second outer frame 22R and the second side cover 58R is omitted, the fifth opening 22RO is shown by a two-dot chain line. As shown in FIG. 7, the fifth opening 22RO overlaps the second arm cylinder 48R when viewed in the width direction $D_W$. The second side cover 58R comprises a perforated panel and is attached to cover the fifth opening 22RO as shown in FIG. 9. Similarly to the first side cover 58L, the second side cover 58R includes pores 58H in a region overlapping the fifth opening 22RO. The pores 58H preferably have a circular shape when viewed from the front of the first side cover 58L, and the diameter of the circle is preferably smaller than the size of the main debris (tree branches, leaves, sawdust) of the marcher operation. Referring to FIG. 7, the vehicle body frame 2 further includes a second bottom frame 26R for connecting the second inner frame 21R and the second outer frame 22R below the second connection frame 23R in the height direction $D_H$. The fifth opening 22RO is provided closer to the second bottom frame 26R than the second connection frame 23R in the height direction $D_H$. Specifically, a distance W3 in the height direction $D_H$ between the lower end of the fifth opening 22RO and the upper end of the second bottom frame 26R is shorter than a distance W4 in the height direction $D_H$ between the lower end of the second connection frame 23R and the upper end of the fifth opening 22RO. The second inner frame 21R includes at least one sixth opening 21RO for communicating the second internal space 56R with the engine chamber 55 which is opposite to the second internal space 56R with respect to the second inner frame 21R. At least one sixth opening 21RO includes a sixth upper opening 21ROT provided above the fifth opening 22RO in the width direction $D_W$ and a sixth lower opening 21ROB provided below the fifth opening 22RO in the width direction $D_W$.

As shown in FIGS. 1, 2, 6, and 7, the work vehicle 1 includes a fan 71 which is positioned between the first inner frame 21L and the second inner frame 21R in the width direction $D_W$, and further positioned in the height direction $D_H$ and the width direction $D_W$ than the first opening 23LO, the second opening 22LO, at least one third opening 21LO, the fourth opening 23RO, the fifth opening 22RO, at least one sixth opening 21RO, and the upper vent 8a. Referring to FIGS. 6 to 9, the rear cover 9 is provided behind the fan 71 and has a rear vent 9a. Therefore, when performing a marcher operation in which the main debris is tree branches, leaves and sawdust, by covering the first opening 23LO with a first cover 60L and covering the fourth opening 23RO with a second cover 60R, ingress of debris from the first opening 23LO and the fourth opening 23RO, which are larger than debris such as tree branches, leaves and sawdust, is suppressed. In addition, outside air can be taken in from the upper vent 8a and the pore 58H which are smaller in size than debris such as tree branches, leaves and sawdust, the engine chamber 55 can be cooled, and the heated air can be discharged from the rear vent 9a. Therefore, the engine chamber 55 can be cooled while preventing the invasion of debris. On the other hand, during normal excavation work, the possibility of debris entering the engine chamber 55 from above is low, and instead, debris is small in size such as earth, sand or pebbles. Therefore, in the normal excavation work, the first cover 60L and the second cover 60R are removed, and the first side cover 58L and the second side cover 58R having no pores 58H are mounted. Thus, outside air can be taken in from the first opening 23LO, the fourth opening 23RO, and the upper vent 8a, the engine chamber 55 can be cooled, and the heated air can be discharged from the rear vent 9a. At this time, invasion of debris from the second opening 22LO and the fifth opening 22RO is suppressed by the first side cover 58L and the second side cover 58R having no pores 58H.

Further, the first cover 60L includes a first cylinder insertion cut 63L and a first hose insertion cut 65L, and the first cylinder insertion cut 63L can be fastened by the first clamp 59L. Therefore, the first side cover 58L can be attached and detached even when the first arm cylinder 48L and the member connecting the at least one first arm cylinder hydraulic hose 52L to the first arm cylinder hydraulic hose 52L are always connected. Similarly, the second cover 60R includes a second cylinder insertion cut 63R and a second hose insertion cut 65R, and the second cylinder insertion cut 63R can be fastened by the second clamp 59R. Therefore, the second side cover 58R can be attached and detached even when the second arm cylinder 48R and the member for connecting the at least one second arm cylinder hydraulic hose 52R to the second arm cylinder 48R are always connected. Therefore, the first side cover 58L and the second side cover 58R can be easily mounted according to the operation.

Modified Example

In the above-described embodiment, the components provided on the left side with respect to the vehicle body center plane M are referred to as first, and the components provided on the right side with respect to the vehicle body center plane M are referred to as second. However, a component provided on the right side with respect to the vehicle body center plane M may be referred to as a first, and a component provided on the left side with respect to the vehicle body center plane M may be referred to as a second.

"Comprising" and derivatives thereof are non-limiting terms describing the presence of an element and do not exclude the presence of other elements not described. This also applies to "have," "include," and derivatives thereof.

The terms "member", "part", "element", "body", and "structure" may have multiple meanings, such as a single part or a plurality of parts.

Ordinal numbers such as "first" and "second" are merely terms used to identify the structure and have no other meaning (e.g., a particular order). For example, the existence of the "first element" does not imply the existence of the "second element", and the existence of the "second element" does not imply the existence of the "first element".

Terms such as "substantially", "about", and "approximately" to indicate the degree may mean a reasonable amount of deviation such that the final result does not change significantly, unless otherwise stated in the embodiments. All numerical values set forth herein may be construed to include words such as "substantially", "about", and "approximately".

In this application, the phrase "at least one of A and B" should be interpreted to include only A, only B, and both A and B.

It is apparent from the above disclosure that various modifications and modifications of the present invention are possible. Accordingly, the present invention may be carried out by a method different from the specific disclosure of the present application without departing from the spirit of the present invention.

What is claimed is:

1. A work vehicle comprising:
a vehicle body frame comprising:
  a first inner frame having a first connection and a first inner projection projecting above from the first connection in a height direction along a height of the work vehicle;
  a first outer frame provided opposite to the first inner frame and having a second connection and a first outer projection projecting above from the second connection in the height direction; and
  a first connection frame having a first opening and connected to the first connection and the second connection between the first inner frame and the first outer frame;
a first arm assembly provided between the first inner frame and the first outer frame in a width direction perpendicular to the height direction and connected to the first inner frame and the first outer frame rotatably about a first rotational axis that extends in the width direction;
a first arm hydraulic cylinder provided between the first inner frame and the first outer frame in the width direction to pass through the first opening, the first arm hydraulic cylinder being connected to the first inner frame and the first outer frame rotatably about a second rotational axis that extends in the width direction and that is provided below the first connection frame in the height direction, the first arm hydraulic cylinder having a first cylinder central axis along which the first arm hydraulic cylinder is configured to extend and contract to move the first arm assembly, the first cylinder central axis extending in a direction perpendicular to the second rotational axis; and a first cover configured to surround an outer periphery of the first arm hydraulic cylinder around the first cylinder central axis to cover the first opening and provided on the first connection frame to be slidably guided by the first connection frame, the first inner projection, and the first outer projection.

2. The work vehicle according to claim 1, wherein the first cover is made of a sheet of an elastic member.

3. The work vehicle according to claim 2, wherein the first cover comprises
a first cylinder insertion hole through which the first arm hydraulic cylinder is configured to pass, and
a first cylinder insertion cut extending from a side of the sheet of first cover to the first cylinder insertion hole, and
wherein the work vehicle further comprises a first clamp configured to fasten the outer periphery of the first arm hydraulic cylinder and the elastic member of the first cover around the first cylinder insertion hole.

4. The work vehicle according to claim 3, further comprising:
at least one first arm cylinder hydraulic hose connected to the first arm hydraulic cylinder and provided to pass through the first opening,
wherein the first cover includes
a first hose insertion hole through which the at least one first arm cylinder hydraulic hose is configured to pass, and
a first hose insertion cut extending from a side of the sheet of the first cover to the first hose insertion hole.

5. The work vehicle according to claim 2, further comprising:
a work implement swingably supported by the first arm assembly;
a first working tool cylinder configured to tilt the work implement with respect to the first arm assembly; and
at least one first working tool cylinder hydraulic hose connected to the first working tool cylinder to pass through the first opening,
wherein the first cover further includes
a first inner side configured to abut against the first inner projection, and
a first recess portion recessed from the first inner side, and
wherein the at least one first working tool cylinder hydraulic hose is provided to pass through the first recess portion.

6. The work vehicle according to claim 1, wherein the vehicle body frame further comprises:
a second inner frame having a third connection and a second inner projection projecting above from the third connection in the height direction;
a second outer frame provided opposite to the second inner frame and having a fourth connection and a second outer projection projecting above from the fourth connection in the height direction; and a second connection frame having a fourth opening and connected to the third connection and the fourth connection between the second inner frame and the second outer frame;
wherein the work vehicle further comprises:
a second arm assembly rotatably connected to the second inner frame and the second outer frame about the first rotational axis;
a second arm hydraulic cylinder provided between the second inner frame and the second outer frame in the width direction to pass through the fourth opening, the second arm hydraulic cylinder being connected to the second inner frame and the second outer frame rotatably about the second rotational axis, the second arm hydraulic cylinder having a second cylinder central axis along which the second arm hydraulic cylinder is configured to extend and contract to move the second arm assembly, the second cylinder central axis extending in a direction perpendicular to the second rotational axis; and
a second cover configured to surround an outer periphery of the second arm hydraulic cylinder around the second cylinder central axis to cover the fourth opening and provided on the second connection frame to be slidably guided by the second connection frame, the second inner projection, and the second outer projection.

7. The work vehicle according to claim 6, wherein the second cover is made of a sheet of an elastic member.

8. A work vehicle comprising:
a vehicle body frame comprising:
a first connection frame having a first opening;
a first outer frame having a second opening;
a first inner frame having at least one third opening and provided opposite to the first inner frame in a width direction along a width of the work vehicle; and
the first connection frame connecting the first inner frame and the first outer frame to define a first internal space between the first inner frame and the first outer frame below the first connection frame in a height direction perpendicular to the width direction, the first internal space communicating with a first external space opposite to the first internal space with respect to the first outer frame through the second opening, the first internal space communicating with an engine chamber opposite to the first internal space with respect to the first inner frame through the at least one third opening;
a first side cover made of a perforated panel and detachably attached to the first outer frame to cover the second opening;
a first arm assembly rotatably connected to the first inner frame and the first outer frame about a first rotational axis extending in the width direction; and
a first arm hydraulic cylinder rotatably connected to the first inner frame and the first outer frame about a second rotational axis extending in the width direction to pass through the first opening such that the first arm hydraulic cylinder overlaps with the second opening as viewed in the width direction, the first arm hydraulic cylinder having a first cylinder central axis along which the first arm hydraulic cylinder is configured to extend and contract to move the first arm assembly, the first cylinder central axis extending in a cylinder axis direction perpendicular to the second rotational axis.

9. The work vehicle according to claim 8, wherein the vehicle body frame further includes a first bottom frame connecting the first inner frame and the first outer frame below the first connection frame in the height direction, and wherein the second opening is provided closer to the first bottom frame than the first connection frame in the height direction.

10. The work vehicle according to claim 8,
wherein the at least one third opening comprises
a third upper opening provided above the second opening as viewed in the width direction, and
a third lower opening provided below the second opening as viewed in the width direction.

11. The work vehicle according to claim 8,
the vehicle body frame further comprising:
a second connection frame having a fourth opening;
a second outer frame having a fifth opening;
a second inner frame having at least one sixth opening and provided opposite to the first inner frame with respect to the engine chamber in the width direction to face the second outer frame in the width direction; and
the second connection frame connecting the second inner frame and the second outer frame to define a second internal space between the second inner frame and the second outer frame below the second connection frame in the height direction, the second internal space communicating with a second external space opposite to the second internal space with respect to the second outer frame through the fifth opening, the second internal space communicating with the engine chamber through the at least one sixth opening,
the work vehicle further comprising:
a second arm assembly rotatably connected to the second inner frame and the second outer frame about the first rotational axis and swingably supporting the work implement;
a second side cover made of a perforated panel and detachably attached to the second outer frame to cover the fifth opening;
a second arm hydraulic cylinder rotatably connected to the second inner frame and the second outer frame about the second rotational axis to pass through the fourth opening, the second arm hydraulic cylinder having a second cylinder central axis along which the second arm hydraulic cylinder is configured to extend and contract to move the second arm assembly, the second cylinder central axis extending in a direction perpendicular to the second rotational axis, the second arm hydraulic cylinder overlapping with the fifth opening as when viewed in the width direction;
a bonnet cover covering an upper portion of the engine compartment and having an upper vent;
a fan provided between the first inner frame and the second inner frame in the width direction and provided in back of the first opening, the second opening, the at least one third opening, the fourth opening, the fifth opening, the at least one sixth opening, and the upper vent in a front-back direction perpendicular to the height direction and the width direction; and
a rear cover having a rear vent provided in back of the fan in the front-back direction.

12. The work vehicle according to claim 11, comprising:
a second cover provided on the second connection frame to surround an outer periphery of the second arm hydraulic cylinder around the second cylinder central axis to cover the fourth opening,
wherein the second inner frame includes a second inner projection projecting above the second connection frame in the height direction,
wherein the second outer frame includes a second outer projection projecting above the second connection frame in the height direction, and
wherein the second cover is configured to be slidably guided by the second inner projection, the second outer projection, and the second connection frame.

13. The work vehicle according to claim 12,
wherein the second cover is made of a sheet of an elastic member,
wherein the second cover comprises
a second cylinder insertion hole through which the second arm hydraulic cylinder is configured to pass, and
a second cylinder insertion cut extending from a side of the sheet of the second cover to the second cylinder insertion hole, and
wherein the work vehicle further comprises a second clamp configured to fasten the outer periphery of the second arm hydraulic cylinder and the elastic member of the second cover around the second cylinder insertion hole.

14. The work vehicle according to claim 13, further comprising:
at least one second arm hydraulic cylinder hydraulic hose connected to the second arm hydraulic cylinder to pass through the fourth opening,
wherein the second cover includes
a second hose insertion hole through which the at least one second arm hydraulic cylinder hydraulic hose is configured to pass, and
a second hose insertion cut extending from a side of the sheet of the second cover to the second hose insertion hole.

15. The work vehicle according to claim 13, further comprising:
a second working tool cylinder configured to tilt the work implement with respect to the second arm assembly; and
at least one second working tool cylinder hydraulic hose connected to the second working tool cylinder to pass through the fourth opening,
wherein the second cover includes
a second inner side configured to abut against the second inner frame, and
a second recess portion recessed from the second inner side, and
wherein the at least one second working tool cylinder hydraulic hose is provided to pass through the second recess portion.

16. The work vehicle according to claim 8, further comprising:
a first cover provided on the first connection frame to surround an outer periphery of the first arm hydraulic cylinder around the first cylinder central axis to cover the first opening,
wherein the first inner frame includes a first inner projection projecting above the first connection frame in the height direction, wherein the first outer frame includes a first outer projection projecting above the first connection frame in the height direction, and wherein the first cover is configured to be slidably guided by the first inner projection, the first outer projection, and the first connection frame.

17. The work vehicle according to claim 16, wherein the first cover is made of a sheet of an elastic member.

18. The work vehicle according to claim 17, wherein the first cover comprises
- a first cylinder insertion hole through which the first arm hydraulic cylinder is configured to pass,
- a first cylinder insertion cut extending from a side of the sheet of the first cover to the first cylinder insertion hole, and wherein the work vehicle further comprises a first clamp configured to fasten the outer periphery of the first arm hydraulic cylinder and the elastic member of the first cover around the first cylinder insertion hole.

19. The work vehicle according to claim 18, further comprising:
- at least one first arm hydraulic cylinder hydraulic hose connected to the first arm hydraulic cylinder to pass through the first opening, wherein the first cover includes
- a first hose insertion hole through which the at least one first arm hydraulic cylinder hydraulic hose is configured to pass, and
- a first hose insertion cut extending from a side of the sheet of the first cover to the first hose insertion hole.

20. The work vehicle according to claim 17, further comprising:
- a work implement swingably supported by the first arm assembly;
- a first working tool cylinder configured to tilt the work implement with respect to the first arm assembly; and
- at least one first working tool cylinder hydraulic hose connected to the first working tool cylinder to pass through the first opening, wherein the first cover further includes
- a first inner side configured to abut against the first inner frame, and
- a first recess portion recessed from the first inner side, and wherein the at least one first working tool cylinder hydraulic hose is provided to pass through the first recess portion.

* * * * *